US012060451B2

(12) United States Patent
Modro et al.

(10) Patent No.: US 12,060,451 B2
(45) Date of Patent: Aug. 13, 2024

(54) NITROGEN-FREE AND LOW-NITROGEN CROSSLINKING ADDITIVES FOR COLD-CURE FLEXIBLE SLABSTOCK FOAM HAVING IMPROVED COMPRESSION AND AGING PROPERTIES

(71) Applicant: Evonik Operations GmbH, Essen (DE)

(72) Inventors: Harald Modro, Gladbeck (DE); Kai-Oliver Feldmann, Essen (DE); Mladen Vidakovic, Duisburg (DE); Rüdiger Landers, Essen (DE); Daniela Hermann, Düsseldorf (DE)

(73) Assignee: Evonik Operations GmbH, Essen (DE)

( * ) Notice: Subject to any disclaimer, the term of this patent is extended or adjusted under 35 U.S.C. 154(b) by 120 days.

(21) Appl. No.: 17/367,456

(22) Filed: Jul. 5, 2021

(65) Prior Publication Data

US 2022/0017680 A1    Jan. 20, 2022

(30) Foreign Application Priority Data

Jul. 16, 2020  (EP) .................................. 20186111

(51) Int. Cl.
| | | |
|---|---|---|
| *A47C 27/14* | (2006.01) | |
| *B01J 23/14* | (2006.01) | |
| *C08G 18/18* | (2006.01) | |
| *C08G 18/20* | (2006.01) | |
| *C08G 18/24* | (2006.01) | |
| *C08G 18/30* | (2006.01) | |
| *C08G 18/32* | (2006.01) | |
| *C08G 18/48* | (2006.01) | |
| *C08G 18/63* | (2006.01) | |
| *C08G 18/65* | (2006.01) | |
| *C08G 18/66* | (2006.01) | |
| *C08G 18/76* | (2006.01) | |
| *C08G 101/00* | (2006.01) | |

(52) U.S. Cl.
CPC .......... *C08G 18/4829* (2013.01); *A47C 27/14* (2013.01); *B01J 23/14* (2013.01); *C08G 18/3206* (2013.01); *C08G 2101/00* (2013.01); *C08G 2110/0083* (2021.01)

(58) Field of Classification Search
None
See application file for complete search history.

(56) References Cited

U.S. PATENT DOCUMENTS

| | | | |
|---|---|---|---|
| 4,752,626 A | 6/1988 | Hoye et al. | |
| 4,950,694 A | 8/1990 | Hager | |
| 6,734,217 B1 | 5/2004 | Herrmann et al. | |
| 7,671,104 B2 | 3/2010 | Heinemann et al. | |
| 7,838,566 B2 | 11/2010 | Glos et al. | |
| 8,293,808 B2 | 10/2012 | Herrington et al. | |
| 9,982,085 B2 | 5/2018 | Landers et al. | |
| 10,100,148 B2 | 10/2018 | Emmrich-Smolczyk et al. | |
| 10,590,228 B2 | 3/2020 | Guenther et al. | |
| 10,995,174 B2 | 5/2021 | Emmrich-Smolczyk et al. | |
| 2006/0178443 A1 | 8/2006 | Boinowitz et al. | |
| 2006/0235100 A1 | 10/2006 | Kaushiva et al. | |
| 2007/0072951 A1 | 3/2007 | Bender et al. | |
| 2007/0093565 A1* | 4/2007 | Glos .................. C08G 18/1833 521/112 |
| 2007/0213420 A1* | 9/2007 | Kimura .............. C08G 18/6677 521/99 |
| 2007/0270518 A1 | 11/2007 | Nutzel | |
| 2007/0282026 A1 | 12/2007 | Grigsby et al. | |
| 2008/0085945 A1* | 4/2008 | Sasaki ................ C08G 18/4866 521/174 |
| 2008/0234402 A1 | 9/2008 | Lehmann et al. | |
| 2008/0277360 A1* | 11/2008 | Ecker ......................... A47F 7/30 119/28.5 |
| 2009/0088489 A1 | 4/2009 | Terheiden et al. | |
| 2010/0240786 A1 | 9/2010 | Glos et al. | |
| 2011/0257280 A1 | 10/2011 | Glos et al. | |
| 2011/0306694 A1 | 12/2011 | Glos et al. | |
| 2013/0041057 A1 | 2/2013 | Emmrich-Smolczyk et al. | |
| 2013/0041058 A1 | 2/2013 | Emmrich-Smolczyk et al. | |
| 2014/0221518 A1 | 8/2014 | Emmrich-Smolczyk et al. | |
| 2015/0031781 A1 | 1/2015 | Anders et al. | |
| 2016/0304685 A1 | 10/2016 | Emmrich-Smolczyk et al. | |

(Continued)

FOREIGN PATENT DOCUMENTS

| | | |
|---|---|---|
| CN | 105 968 307 | 9/2016 |
| CN | 109970949 A | 7/2019 |

(Continued)

OTHER PUBLICATIONS

Machine trans of JP-2003313267-A obtained from the European Patent Office in Dec. 2023 (Year: 2023).*
European Search Report mailed on Dec. 21, 2020 in EP 20186111.9 (11 pages).
Klostermann et al., U.S. Appl. No. 17/612,663, filed Nov. 19, 2021.
Klostermann et al., U.S. Appl. No. 17/612,690, filed Nov. 19, 2021.
Klostermann et al., U.S. Appl. No. 17/321,609, filed May 17, 2021.
Klostermann et al., U.S. Appl. No. 17/331,429, filed May 26, 2021.
Klostermann et al., U.S. Appl. No. 17/331,452, filed May 26, 2021.
Klostermann et al., U.S. Appl. No. 17/333,559, filed May 28, 2021.

(Continued)

*Primary Examiner* — Melissa A Rioja
(74) *Attorney, Agent, or Firm* — Grüneberg and Myers PLLC

(57) ABSTRACT

Process for producing cold-cure flexible slabstock PU foams by reaction of at least one polyol component and at least one isocyanate component in the presence of water and at least one catalyst and at least one crosslinker, wherein no nitrogen-containing crosslinkers having an expanded OH number above 1000 mg KOH/g are employed in a total amount >0.5 parts by weight, preferably >0.1 parts by weight, based on 100 parts by weight of polyol.

17 Claims, No Drawings

(56) References Cited

U.S. PATENT DOCUMENTS

| | | |
|---|---|---|
| 2020/0377684 A1 | 12/2020 | Hermann et al. |
| 2021/0015269 A1 | 1/2021 | Terheiden et al. |
| 2021/0047474 A1 | 2/2021 | Klostermann et al. |
| 2021/0137276 A1 | 5/2021 | Landers et al. |
| 2021/0214488 A1 | 7/2021 | Emmrich-Smolczyk et al. |
| 2021/0253780 A1 | 8/2021 | Wessely et al. |

FOREIGN PATENT DOCUMENTS

| | | |
|---|---|---|
| DE | 10 2007 046 860 A1 | 4/2009 |
| EP | 0 656 382 B1 | 8/1998 |
| EP | 1 161 474 A1 | 12/2001 |
| EP | 1 678 232 A2 | 7/2006 |
| EP | 1 712 578 A1 | 10/2006 |
| EP | 1 977 825 A1 | 10/2008 |
| EP | 1 985 642 A1 | 10/2008 |
| EP | 1 985 644 A1 | 10/2008 |
| JP | 2003313267 A * | 11/2003 |
| WO | 00/47647 A1 | 8/2000 |
| WO | 00/58383 A1 | 10/2000 |
| WO | 2005/033167 A2 | 4/2005 |
| WO | 2005/085310 A2 | 9/2005 |
| WO | 2013/156237 A2 | 10/2013 |
| WO | 2016/005149 A1 | 1/2016 |
| WO | 2016/020200 A1 | 2/2016 |
| WO | 2021/007838 A1 | 1/2021 |
| WO | 2021/007839 A1 | 1/2021 |

OTHER PUBLICATIONS

Hermann et al., U.S. Appl. No. 17/448,240, filed Sep. 21, 2021.
Ferenz et al., U.S. Appl. No. 17/523,059, filed Nov. 10, 2021.
Klostermann et al., U.S. Appl. No. 17/617,020, filed Dec. 7, 2021.
Klostermann et al., U.S. Appl. No. 17/617,127, filed Dec. 7, 2021.

* cited by examiner

NITROGEN-FREE AND LOW-NITROGEN CROSSLINKING ADDITIVES FOR COLD-CURE FLEXIBLE SLABSTOCK FOAM HAVING IMPROVED COMPRESSION AND AGING PROPERTIES

CROSS REFERENCE TO RELATED APPLICATIONS

This application is a 35 U.S.C. § 119 patent application which claims the benefit of European Application No. 20186111.9 filed Jul. 16, 2020, which is incorporated herein by reference in its entirety.

FIELD

The present invention is in the field of polyurethanes (PU), preferably PU foams. It especially relates to the provision of cold-cure flexible slabstock PU foams, such as for example mattresses and/or cushions, having improved long-term usage and aging properties.

BACKGROUND

Cold-cure flexible slabstock PU foams, for example cold-cure flexible slabstock PU foam-containing mattresses, have long been known from the prior art and are employed worldwide. There has been no shortage of attempts to achieve ever greater improvements in such articles and the production thereof. The need for optimization has not been fully satisfied to the present day.

One problem associated with cold-cure flexible slabstock PU foams is the long-term usage properties thereof. Thus, longer-term use of mattresses can lead to local softening of the mattress foam and the formation of dips and hollows, especially in the region of greatest load. Causative factors are alteration processes in the mattress foam under the influence of the weight of the user. These especially include the hours-long compression of the foam by the sleeping person. These long-term usage properties are a substantial reason why foam mattresses often require replacement by new ones after several years of use. As is immediately apparent, such an application of force associated with the compression of cold-cure flexible slabstock PU foams may result in material fatigue. It is a very relevant problem to provide cold-cure flexible slabstock PU foams which even after extended compression are capable of recovering their original dimensions.

Against this backdrop the present invention specifically has for its object the provision of cold-cure flexible slabstock PU foams, such as in particular cold-cure flexible slabstock PU foam-containing mattresses and/or cushions, having improved long-term usage properties.

In the context of the present invention it has surprisingly been found that when in the production of a cold-cure flexible polyurethane foam as a slabstock foam the employed crosslinker has at most a low nitrogen content and the formulation for producing the cold-cure flexible slabstock polyurethane foam has substantially no other nitrogen-containing crosslinker added to it either, the thus-produced cold-cure flexible slabstock polyurethane foams exhibit improved long-term usage properties and aging properties compared to cold-cure flexible slabstock polyurethane foams obtained using customary nitrogen-containing crosslinkers.

Polyurethane foams are widely used for the production of mattresses and upholstered furniture. Various types of flexible foams are employed. These include not only standard ether foams but also cold-cure flexible foams (also known as high elasticity foams). In terms of their mechanical properties these are characterized by a rebound elasticity of preferably >=50% (according to the definition of "Fachverband Schaumkunststoffe und Polyurethane e.V., D-70435 Stuttgart"="FSK"). Rebound elasticity is measured according to DIN EN ISO 8307:2008-03. The comfort factor is a further criterion. This should be above 2.5 (according to FSK definition) (measured according to DIN EN ISO 2439: 2009-05). Cold-cure flexible foams are produced either as slabstock foams or as moulded foams. In the case of slabstock foams the foam rises freely while in moulded foams it is limited in its expansion in a mould.

In slabstock foam technology the foam can thus freely rise in at least one direction (for example upwards). The pressure in the gas bubbles of the rising foam is normally approximately equal to atmospheric pressure. By contrast, the expansion in molded foams is limited by a mold. In the case of molded foams an excess of reaction mixture is always used to ensure that the mold is completely filled. This is referred to as overpacking. The expansion of the foam therefore results in a pressure increase in the cells and partial compression of the cell gas. The shape of the resulting foam body is in the case of molded foams specified by the geometry of the mold. At the interface with the mold a skin is formed which in terms of its properties (density, air permeability, cell size, haptics) differs markedly from the interior of the foam part.

Forming a constituent of the present invention are cold-cure PU foams produced using slabstock foam technology, i.e. cold-cure flexible slabstock PU foam.

In terms of the chemical formulation for producing cold-cure flexible slabstock PU foams ether polyols having markedly higher molar masses than standard ether flexible foams are preferred. While polyols for standard ether flexible foams are at a functionality of 3 characterized by an average molar mass (number-average) of 3000-3500 g/mol, polyols for cold-cure flexible foams preferably have molar masses of >4500 g/mol also at a functionality of 3. Based on a functional group (OH group) cold-cure flexible foam polyols are thus characterized by a polyol mass of preferably >1500 g/mol. These cold-cure flexible foam polyols are generally in the majority (>50%) in the foam formulation. Normally, primary OH groups are preferred for cold-cure foam polyols and secondary OH groups are preferred for standard ether polyols. An important factor for the properties of the foam (higher elasticity) is the higher molar mass which brings about an elevated flexibility and thus elasticity of the polyurethane network. However, this also results in a lower hardness of the resulting cold-cure flexible foams. Cold-cure flexible foam polyols are therefore often also admixed with solid polymer particles. These increase the hardness of the resulting foams. Such so-called polymer polyols are often employed in cold-cure flexible foam formulations. The polymer polyols include particles of for example styrene-acrylonitrile polymers or other polymer particles. During production of the polymer polyols covalent bonds to the surrounding liquid polyol phase are formed (for example by grafting).

Production of the cold-cure flexible polyurethane foam typically employs further components. In addition to the isocyanate, water is typically employed as a chemical blowing agent. Physical blowing agents may optionally also be employed. Both TDI and MDI are typically used as isocyanates. Amine catalysts and tin compounds are typically employed as catalysts. Amine catalysts are typically characterized in that they comprise tertiary amine structures. This is appropriate since otherwise the catalytically active amine would rapidly react with isocyanate and thus be deactivated. However, tertiary amine catalysts may contain additional groups which ensure that slow reaction of the molecule with isocyanate is achieved and that the amine catalyst, after completed reaction, is incorporated into the polyurethane foam. This is in practice used to inhibit emission of the often odor- and VOC-intensive amine catalysts from the foam. A typical example here would be dimethylethanolamine for example. These amine catalysts are characterized in that they comprise one or at most two, but not more than 2, isocyanate-reactive groups. They therefore do not contribute to the crosslinking of the polyurethane foam but are anchored into the polyurethane network merely for reasons of VOC and odor optimization. The usage amount of the employed amine catalysts is preferably 0.05-0.5 parts, i.e. preferably about 0.03% to 0.35% by weight. In addition to the amine catalysts it is usual to also use tin catalysts (such as tin octoate) to additionally catalyse the formation of the cold-cure flexible slabstock foam. Typically also employed in addition to the catalysts are cold-cure flexible foam stabilizers. These are silicone compounds such as are more particularly described in the literature for cold-cure flexible foams. Crosslinkers must also be used in the production of cold-cure flexible foams. Crosslinkers have the feature that they have a functionality of isocyanate-reactive groups of ≥3. The crosslinkers are necessary to ensure sufficient stability of the cold-cure flexible slabstock foam formulation during rising and subsequent curing. Without the use of suitable crosslinkers a collapse of the rising cold-cure flexible slabstock foam is generally observed. The crosslinkers further ensure an increase in the hardness of the resulting polyurethane foam and improve the dimensional stability of the resulting foam blocks during curing. Chemically, the crosslinkers employed in the prior art are typically nitrogen-containing alkanolamines having at least three isocyanate-reactive groups. Examples from the prior art include triethanolamine (TEOA), diethanolamine (DEOA), diisopropanolamine (DIPA) or dipropanolamine (DPA). Diethanolamine, diisopropanolamine and dipropanolamine comprise not only the two OH groups but also a reactive NH moiety which constitutes the third reactive group. The molar masses of these nitrogen-based, low molecular weight crosslinkers of the prior art are below 500 g/mol [M(triethanolamine)=149.2 g/mol, M(diethanolamine)=105.1 g/mol, M(diisopropanolamine)=133.2 g/mol, M(dipropanolamine)=133.2 g/mol]. The expanded OH numbers are triethanolamine (TEOA) 1128 mg KOH/g, diethanolamine (DEOA) 1601 mg KOH/g, diisopropanolamine (DIPA) 1263 mg KOH/g or dipropanolamine (DPA) 1236 mg KOH/g. The expanded OH numbers are above 1000 mg KOH/g.

In the context of this invention the expanded OH number refers to the sum of the conventional OH number determinable as is customary according to the DIN standard DIN 53240-2:2007-11 and the amine number based on the primary and secondary amine functions present. The primary and secondary amine functions are important for crosslinkers since they are directly reactable with the isocyanate. The amine number based on the primary and secondary amine groups is determinable by titration of the total amine number according to DIN 51376:2002-11. Said number has units of mg KOH/g of sample. In order then to obtain the amine number based only on the primary and secondary amine groups the proportion of the primary, secondary and tertiary amines must be determined according to DIN EN ISO 9702:1998-10 and the proportion of the primary and secondary amine groups calculated based on the amine number. This proportion of the primary and secondary amine groups in the amine number is then subsumed in the expanded OH number. Accordingly, if no amine functions or only tertiary amine functions are present the expanded OH number is equal to the conventional OH number.

Water is not taken into account in the PU industry and for the purposes of the present invention in the case of water-containing mixtures since it must be separately considered as a chemical blowing agent (reaction with the isocyanate). The conventional OH numbers (in mg of KOH per g of sample) therefore do not take into account the water content which must be separately reported. In the case of water-containing samples the OH number may also be determined by analytical measurement (for example DIN 53240-2-2007-11) but for water-containing samples must be combined with water determination (Karl Fischer according to ISO 760:1978) to calculate the OH number without water. The expanded OH number for water-containing mixtures is the sum of the conventional OH number without water and the amine number based on primary and secondary amines.

However, even after blow-off of the foam insufficient or excessively late crosslinking can still result in deformation of the resulting cold-cure flexible foam slabs. The blocks undergo spreading in the lower region via a deformation of the cell structure. This phenomenon is known in cold-cure flexible slabstock foams as "cold flow". It first appeared when on account of toxicological concerns organotin compounds (particularly dibutyltin dilaurate) had to be replaced by tin salts (for example tin octoate). The reason for this is the deactivation of tin salts during the reaction by hydrolysis and thus the lack of catalyst assistance for the final curing of the foam. As a countermeasure so-called anti-cold flow additives were thus sometimes additionally employed in cold-cure flexible slabstock foam formulations. These too have a crosslinking effect. However, in contrast to the abovementioned strong crosslinkers the effect on foaming is to be minimized here. The expanded OH number of the anti-cold flow additives is therefore typically <1000 mg KOH/g. Typical anti-cold flow additives also contain nitrogen-containing components Typically anti-cold flow additives are therefore employed in cold-cure flexible slabstock foam formulations not alone but in combination with at least one strong, low molecular weight (molar mass <500 g/mol) crosslinker. These strong crosslinkers were necessary even before the change from organotin to tin salts.

Optionally, it is advantageously possible also to additionally use further customary additives, active substances and auxiliaries.

A typical cold-cure flexible slabstock foam formulation according to the prior art is therefore approximately as follows:

Typical Formulation for Producing a Cold-Cure Slabstock Foam According to the Prior Art:
- 100 X parts of cold-cure foam polyol
- X parts of cold-cure foam polyol comprising polymer particles
- 1-4 parts of water
- Optionally physical blowing agents (for example methylene chloride, liquid $CO_2$ etc.)
- 0.1-0.3 parts of amine catalysts (for example DMEA, TEDA, BDME, reactive amine catalysts)
- 0.05-0.2 parts of tin catalysts (for example tin octoate=tin salt)
- 0.5-2 parts of nitrogen-based crosslinker (alkanolamine) (typically DEOA)

0-1.5 parts by weight of anti-cold flow additive, for example ORTEGOL® 204

0.1-0.8 parts of stabilizer 25-60 parts of isocyanate (TDI 80, TDI 65, MDI).

According to the prior art employed crosslinkers for cold-cure slabstock foam formulations are nitrogen-containing crosslinkers (alkanolamines). However, the thus-produced cold-cure slabstock foams are problematic in terms of their aging properties.

Especially in the measurement of compression set often unsatisfactory values are measured for cold-cure flexible slabstock foams. The compression set test (DIN EN ISO 1856:2008-01) serves in industry as an important indicator for the long-term usage properties of polyurethane foams generally and here particularly for the use of these polyurethane foams in mattresses and upholstered furniture. Mattresses are very particularly preferred in the context of the present invention. This advantageously also applies to all of the following preferred embodiments. Poor (i.e. high) values in compression set measurements are therefore regarded very critically with regard to the expected aging properties of the mattresses, cushions or upholstered furniture by furniture and mattress manufacturers.

In the measurement of compression set, foam test specimens are strongly compressed and in the compressed state stored at elevated temperature for a relatively long time (for example 24 h). The compressing frame is subsequently removed and the extent to which the foam test specimen re-expands is observed. The difference from the original specimen height in percent gives the compression set. The compression set may be measured either dry (but at elevated temperature) or else in a saturated steam atmosphere.

In the context of the present invention it was surprisingly found that the long-term usage properties and the aging properties, particularly the compression set, markedly improve when nitrogen-free or at most low-nitrogen crosslinkers are employed instead of the customary nitrogen-containing alkanolamines.

SUMMARY

The present invention therefore provides a process for producing cold-cure flexible slabstock PU foams by reaction of at least one polyol component and at least one isocyanate component in the presence of water and at least one catalyst, comprising at least one tin catalyst, and at least one crosslinker, characterized in that no nitrogen-containing crosslinkers having an expanded OH number above 1000 mg KOH/g are employed in a total amount >0.5 parts by weight, preferably >0.1 parts by weight, based on 100 parts by weight of polyol, wherein nitrogen-containing crosslinkers in the context of the present invention have a nitrogen content of >0.5% by weight, measured by Kjeldahl analysis, % by weight based on the respective crosslinker, wherein at least two nitrogen-free or low-nitrogen crosslinkers having a nitrogen content of ≤0.5% by weight, measured by Kjeldahl analysis, % by weight based on the respective crosslinker, are employed in a total amount ≥0.1 parts by weight, by preference ≥0.1 to 5 parts by weight, preferably 0.2 to 3 parts by weight, in particular 0.5 to 2 parts by weight, based on 100 parts by weight of polyol, and wherein not more than 4 parts of water per 100 parts of polyol are employed and wherein, based on the total polyol component, >50% by weight of cold-cure flexible foam ether polyols having molar masses of >1500 g/mol per OH group are employed and wherein the individual crosslinkers have a functionality of isocyanate-reactive groups of ≥3 and wherein isocyanates suitable as isocyanate components include all isocyanates containing at least two isocyanate groups and wherein the isocyanate index is >95 and ≤115 and wherein less than 2 parts and preferably no polyester ether having an OH number of 55 to 57 mg KOH/g per 100 parts of polyol is employed.

DETAILED DESCRIPTION

According to the invention, at least two nitrogen-free or low-nitrogen crosslinkers having a nitrogen content of ≤0.5% by weight, measured by Kjeldahl analysis, % by weight based on the respective crosslinker, are employed in a total amount ≥0.1 parts by weight, by preference ≥0.1 to 5 parts by weight, preferably 0.2 to 3 parts by weight, in particular 0.5 to 2 parts by weight, based on 100 parts by weight of polyol. In the context of the present invention "nitrogen-free or low-nitrogen" crosslinkers are crosslinkers having a nitrogen content of ≤0.5% by weight, measured by Kjeldahl analysis, % by weight based on the respective crosslinker. These crosslinkers are especially free from nitrogen. In the context of the present invention "nitrogen-containing crosslinkers" accordingly have a nitrogen content of >0.5% by weight, measured by Kjeldahl analysis, % by weight based on the respective crosslinker.

In particular, no nitrogen-containing crosslinkers having an expanded OH number above 1000 mg KOH/g are employed at all.

It is advantageously ensured that the nitrogen-free or low-nitrogen crosslinker according to the invention is ideally equivalent to the conventional nitrogen-containing crosslinkers in terms of the foaming properties but also the quality of the resulting cold-cure foams.

Nitrogen-free or low-nitrogen crosslinkers preferably employable according to the invention are:

(a) sugar alcohols, preferably comprising sorbitol, mannitol, maltitol, isomalt, lactitol, xylitol, threitol, erythritol and/or arabitol, in particular sorbitol and/or maltitol, (b) glycerols/their derivatives, preferably comprising glycerol, diglycerol and/or triglycerol, in particular diglycerol and/or triglycerol, and/or (c) further low molecular weight nitrogen-free or low-nitrogen crosslinkers such as pentaerythritol and/or 1,1,1-trimethylolpropane, but preferably at least one nitrogen-free or low-nitrogen crosslinker from the group of sugar alcohols and at least one nitrogen-free or low-nitrogen crosslinker from the group of glycerols/their derivatives, very particularly preferably sorbitol and/or maltitol and additionally diglycerol and/or triglycerol are employed.

A mixture of 2 or more low molecular weight nitrogen-free or low-nitrogen crosslinkers proved particularly advantageous in this regard and in terms of improving the long-term usage properties. Therefore, according to the invention, at least two crosslinkers are employed, preferably from the group of sugar alcohols (preferably comprising sorbitol, mannitol, maltitol, isomalt, lactitol, xylitol, threitol, erythritol and/or arabitol, in particular sorbitol and/or maltitol), glycerols/their derivatives (preferably comprising glycerol, diglycerol and/or triglycerol, in particular diglycerol and/or triglycerol) and/or further low molecular weight low-nitrogen crosslinkers such as pentaerythritol 1,1,1-trimethylolpropane, but in particular from the group of sugar alcohols (preferably comprising sorbitol, mannitol, maltitol, isomalt, lactitol, xylitol, threitol, erythritol and/or arabitol) and/or glycerols/their derivatives (preferably comprising glycerol, diglycerol and/or triglycerol). In particular, sorbitol and/or maltitol and additionally diglycerol and/or triglycerol are employed.

It is in accordance with a further preferred embodiment of the invention when the crosslinker is employed as a solvent-containing, preferably water-containing, additive preferably comprising >0% to 50% by weight of solvent, in particular water, and 50% to <100% by weight of crosslinker, said crosslinker preferably comprising sugar alcohol(s), glycerols/their derivatives and/or further low molecular weight nitrogen-free or low-nitrogen crosslinkers, but in particular at least one nitrogen-free or low-nitrogen crosslinker from the group of sugar alcohols and at least one nitrogen-free or low-nitrogen crosslinker from the group of glycerols/their derivatives, in particular said crosslinker comprising sorbitol and/or maltitol, and additionally diglycerol and/or triglycerol. A very particularly preferred embodiment in the context of the present invention accordingly relates to a water-containing additive comprising >0% to 50% by weight of water and 50% to <100% by weight of sorbitol and/or maltitol and additionally diglycerol and/or triglycerol.

It is in accordance with a further preferred embodiment of the invention when in the process according to the invention at least 50% by weight of the altogether employed polyols of the polyol component have a functionality of 2.5 to 4, number-average molecular weights in the range from 4500 to 8000 g/mol and preferably comprise >50%, in particular at least 70% to 95%, of primary hydroxyl groups.

It is in accordance with a further preferred embodiment of the invention when in the process according to the invention polymer polyols are employed.

The invention further provides a cold-cure flexible slabstock PU foam, preferably mattress or cushion, obtainable by the process according to the invention.

In a preferred embodiment of the invention, the cold-cure flexible slabstock PU foam has the feature that based on its starting volume the PU foam body has been compressed by at least 20%, preferably 30%, in particular 40%, and is kept in compressed form by an auxiliary means, in particular packaging means, for at least 20 hours.

The invention further provides for the use of cold-cure flexible slabstock PU foam according to the invention in mattresses and/or cushions, in particular mattresses, for providing mattresses and/or cushions with improved aging, long-term usage and compression properties as well as dimensional recovery after compression compared to cold-cure flexible slabstock polyurethane foams obtained using customary nitrogen-containing crosslinkers. This is apparent from the low values for compression set (dry) or wet compression set (damp) in each case measured according to DIN EN ISO 1856:2008-01 in each case relative to reference foams produced using customary nitrogen-containing crosslinkers. Relatively low values in the compression set test indicate elevated dimensional stability of the test specimen in deformations/compression. By contrast, relatively high values are considered problematic with regard to long-term usage properties in mattresses (formation of indentations).

Improved emission behavior is especially also achieved. Lower values are desirable for the total amount of volatile organic substances (total VOC or TVOC) measured according to DIN EN ISO 16000-9:2008-04 24 hours after test chamber loading in each case measured relative to reference foams produced using customary nitrogen-containing crosslinkers. Lower TVOC values are a direct indicator that fewer volatile organic substances are emitted into the air and are inhalable by consumers.

The invention further provides a crosslinking solvent-containing, preferably water-containing, additive for use in cold-cure flexible slabstock PU foam formulations comprising >0% to 50% by weight of solvent, preferably water, and 50% to <100% by weight of crosslinker, said crosslinker preferably comprising sugar alcohol(s) and/or glycerols/their derivatives, but in particular at least one crosslinker from the group of sugar alcohols and at least one crosslinker from the group of glycerols/their derivatives, with the proviso that no nitrogen-containing crosslinkers having an expanded OH number above 1000 mg KOH/g are employed in a total amount >5% by weight, preferably >1% by weight, in particular >0.1 parts by weight, based on 100% by weight of the solvent-containing additive.

The invention further provides for the use of the additive according to the invention in cold-cure flexible slabstock foam formulations for improving the compression set values of the resulting cold-cure flexible slabstock polyurethane foams compared to cold-cure flexible slabstock polyurethane foams obtained using customary nitrogen-containing crosslinkers. Improving the compression set values (irrespective of whether in the dry or damp state) entails lower values for compression set relative to reference foams produced using customary nitrogen-containing crosslinkers. The optimal theoretically possible value for compression set would be 0%. The values for compression set that are in fact observed are however greater than 0% and depend on the respective polyurethane foam type. However the objective is always to minimize the compression set values.

A further advantage of the invention is that the cold-cure flexible slabstock PU foams obtained according to the invention are low-emission foams.

In the context of the present invention "low-emission" is to be understood as meaning in particular that the cold-cure flexible slabstock PU foam obtained according to the invention has a VOC emission of $\geq 0$ µg/m$^3$ to $\leq 500$ µg/m$^3$, preferably $\leq 200$ µg/m$^3$, particularly preferably $\leq 100$ µg/m$^3$, appropriately determined by the test chamber method based on DIN standard DIN EN ISO 16000-9:2008-04, 24 hours after test chamber loading. This method is described precisely in EP 3205680A1, specifically in paragraph [0070], which is hereby incorporated by reference.

A further advantage of the invention is that the cold-cure flexible slabstock PU foams in question can also meet emission specifications such as CertiPur. Low-emission according to CertiPur is to be understood as meaning that total emissions of volatile organic substances (TVOCs) are less than 500 µg/m$^3$. Further technical information concerning the requirements of the CertiPUR standard (version of 1 Jul. 2017) may be found at: https://www.europur.org/images/CertiPUR Technical_Paper_-_Full_Version_-_2017.pdf. This last-named document (version of 1 Jul. 2017) may also be ordered directly from EUROPUR, Avenue de Cortenbergh 71, B-1000 Brussels, Belgium.

PU foams (polyurethane foams) and the production thereof are well known to those skilled in the art and, per se, require no further elucidation. PU foam bodies in the context of the invention are bodies of different shapes. Preferred shapes in the context of the invention are for example geometries such as spheres, cuboids, cylinders etc. PU foam bodies in the context of the invention are accordingly bodies made of polyurethane foam. Particularly preferred cold-cure flexible PU foam bodies in the context of the present invention are mattresses and/or cushions and also foam blocks in general.

Mattresses per se and the production thereof are known. They usually consist of a mattress core, e.g. comprising foam, latex, natural products and/or a spring core, and a cover surrounding the mattress. A corresponding situation applies to cushions. In the context of the present application the term "mattresses and/or cushions" is to be understood as meaning that at least one section made of cold-cure flexible PU foam is present in the mattress and/or the cushion. This is preferably to be understood as meaning that at least one part of the mattress and/or the cushion consists of cold-cure flexible PU foam. Based on the total weight of the mattress and/or of the cushion, this part can account for at least 1% by weight or 5% by weight or 25% by weight, preferably at least 50% by weight, in particular at least 75% by weight. It is also possible for the mattress and/or the cushion to consist entirely of cold-cure flexible PU foam, apart from the cover.

The production of flexible polyurethane foam in general is known per se. It is formed by the tried and tested reaction of at least one polyol component and at least one isocyanate component in the presence of at least one blowing agent (e.g. water). It is essential to the present invention that a free-rise cold-cure flexible slabstock PU foam is concerned and that this reaction is carried out substantially without the use of nitrogen-containing crosslinkers. The term "free-rise" is to be understood as meaning that a slabstock foam process and not a moulded foam process is concerned.

The polyurethane foam according to the invention is a cold-cure flexible polyurethane foam or a combination of these cold-cure flexible PU foams is used, for example two of these cold-cure flexible PU foams. The term "cold-cure flexible PU foam" is known per se to those skilled in the art and is a fixed technical term which is correspondingly established in the specialist field, but will nevertheless be elucidated briefly here.

Flexible PU foams are elastic and deformable and usually have open cells. As a result, the air can escape easily on compression. In addition, there are also rigid PU foams that are inelastic and usually have closed cells, are used for insulation purposes and are not in the focus of the present invention. There exists a wide variety of flexible PU foams. For instance, those skilled in the art are aware inter alia of ester foams (made from polyester polyols), hot-cure flexible PU foams and cold-cure flexible PU foams. The crucial difference between a hot-cure flexible PU foam and a cold-cure PU foam lies in the different mechanical properties. It is possible to differentiate between hot-cure flexible PU foams and cold-cure flexible PU foams in particular via rebound resilience, also known as "ball rebound" (BR) or "resilience". A method of determining the rebound resilience is described, for example, in DIN EN ISO 8307:2008-03. Here, a steel ball having a fixed mass is allowed to fall from a particular height onto the test specimen and the height of the rebound in % of the drop height is then measured. The values in question for a cold-cure flexible PU foam are preferably in the region of >50%. Cold-cure flexible PU foams are thus also often referred to as HR foams (HR: High Resilience). By contrast, hot-cure flexible PU foams have rebound values of preferably 1% to not more than 50%.

In the context of a preferred embodiment of the invention, the cold-cure flexible slabstock PU foams according to the invention therefore have rebound values of at least 50%, determinable according to DIN EN ISO 8307:2008-03. A further mechanical criterion is the sag or comfort factor. Here, a foam specimen is compressed according to DIN EN ISO 2439:2009-05 and the ratio of compressive stress at 65% and 25% compression is measured. Cold-cure flexible PU foams here have a sag or comfort factor of preferably >2.5. Hot-cure flexible PU foams have a comfort factor of <2.5. In the context of a preferred embodiment of the invention, the cold-cure flexible slabstock PU foams according to the invention have a sag or comfort factor of preferably >2.5, determinable as specified above.

An exact definition of the properties may also be obtained for example from the data sheet "PUR-Kaltschaum" from Fachverband Schaunkunststoffe und Polyurethane e.V. Reference KAL20160323, version of 23 Mar. 2016. (https://www.fsk-vsv.de/wp-content/uploads/2017/03/Produktbeschreibung-PUR-Kaltschaum.pdf). This data sheet can also be ordered directly from Fachverband Schaumkunststoffe und Polyurethane e.V. (FSK), postal address: Stammheimerstr. 35, D-70435 Stuttgart.

The two names hot-cure flexible PU foam and cold-cure flexible PU foam are explained by the historical development of PU technology, and do not necessarily mean that different temperatures occur in the foaming process.

The different mechanical properties of hot-cure PU foams and cold-cure PU foams result from differences in the formulation for production of the foams. In the case of a cold-cure flexible PU foam, predominantly high-reactivity polyols having primary OH groups and average molar mass >4500 g/mol are usually used. In the case of hot-cure flexible PU foams, comparatively predominantly unreactive polyols having secondary OH groups and an average molar mass of <4000 g/mol are usually used. In the case of cold-cure flexible PU foams reaction of the isocyanate groups with the primary hydroxyl groups occurs as early as in the expansion phase ($CO_2$ formation from —NCO and $H_2O$) of the foam. This rapid polyurethane reaction usually leads, as a result of a viscosity increase, to a relatively high intrinsic stability of the foam during the blowing process. This has the result that compared to hot-cure flexible PU foams other foam stabilizers having different siloxane structures are required. Due to the intrinsic stability the cells have generally not been sufficiently opened at the end of the foaming operation of a cold-cure flexible foam and additional mechanical crushing of the cell structure is required.

Production of flexible polyurethane foams may generally be carried out either in a mould (for example made of metal) or in a free rise operation. In the case of cold-cure flexible foams the first case relates to cold-cure flexible moulded foam and the second case relates to cold-cure flexible slabstock foam. Cold-cure flexible slabstock foams are in accordance with the invention.

The open-cell content of cold-cure flexible slabstock PU foams is determined indirectly by measuring the necessary force to crush the cell structure (FTC=force to crush). Cold-cure flexible slabstock PU foams are routinely opened by compression and their air permeability increased ("crushing") during production. The harder and more closed the foam is, the greater the force required therefor. In order to eliminate the influence of hardness the difference between the force required for first compression and the force required in the fully crushed state is considered. The difference represents a measure of the closed-cell content. The higher the value, the more closed the foam. The test specimen used for the measurement is a foam test specimen of 15 cm in height which is in each case compressed to an extent of 50% using a mechanical testing machine (Zwick Z010) and after 10 compressions also subjected to maximal compression by manual means. The foam is then compressed for an 11th time and the force compared with the 1st time. A smallest possible difference between the two values is advantageous for applications in mattresses and furniture.

Depending on the application, cold-cure flexible slabstock PU foams preferably have a foam density between 8 and 80 kg/m$^3$. Especially when such cold-cure flexible slabstock PU foams are used as mattresses, mattress constituents and/or cushions, said foams are differentiated according to regional wants and needs, requirements and preferences of consumers. The preferred cold-cure flexible slabstock PU foam for mattress applications has a foam density of preferably 25-40 kg/m$^3$, particularly preferably 25-35 kg/m$^3$.

Different cold-cure flexible slabstock PU foams are classified for particular applications not only according to foam density but often also according to their compressive strength, also referred to as load-bearing capacity. Thus, the compressive strength CLD (compression load deflection), 40% in accordance with DIN EN ISO 3386-1:2015-10, of cold-cure flexible PU foams is preferably in the range from 1.0-8.0 kPa, preferably 1.5-4 kPa, particularly preferably 2.0-3.0 kPa.

In a preferred embodiment of the invention the cold-cure flexible slabstock PU foams to be employed according to the invention have the following preferred properties in terms of rebound elasticity and foam density, namely a rebound elasticity of more than 50% measured according to DIN EN ISO 8307:2008-03, and/or a foam density of 8 to 80 kg/m$^3$. It is particularly preferable when both criteria in respect of rebound resilience and foam density as specified above are satisfied. In particular, the cold-cure flexible slabstock PU foam used according to the invention has a compressive strength CLD, 40% in accordance with DIN EN ISO 3386-1:2015-10, of 2.0 to 3.0 kPa.

The cold-cure flexible slabstock PU foam body according to the invention, in particular the mattress according to the invention has, in a preferred embodiment of the invention, a height of from at least 1 cm to not more than 50 cm and a width of from at least 20 cm to not more than 300 cm and a length of from at least 20 cm to not more than 300 cm. Preferred dimensions are, for example, heights in the range from 5 cm to 40 cm, widths in the range from 70 cm to 200 cm, lengths in the range from 150 cm to 220 cm. The cold-cure flexible slabstock PU foam body according to the invention, in particular the cushion according to the invention can also have, in a preferred embodiment of the invention, a height of from at least 1 cm to not more than 40 cm and a width of from at least 15 cm to not more than 200 cm and a length of from at least 15 cm to not more than 200 cm, wherein preferred dimensions are, for example, heights in the range from 2 cm to 30 cm, widths in the range from 15 cm to 50 cm, lengths in the range from 15 cm to 50 cm.

In a further preferred embodiment of the invention, the cold-cure flexible slabstock PU foam body is a mattress and is preferably in the form of a multizone mattress. The different zones differ in terms of, in particular, the respective hardness. Such multizone mattresses and the production thereof are known per se. They are widely sold commercially. In particular, the mattress has up to seven zones of differing hardness which extend over the longitudinal direction of the mattress and are given the appropriate width. When the mattress has various hardness zones distributed over its area, which are formed, in particular, by cuts and/or hollow spaces in the mattress, this constitutes a further preferred embodiment of the invention.

In a further preferred embodiment of the invention, the cold-cure flexible slabstock PU foam body may also be a cold-cure PU foam mattress, a viscoelastic flexible PU foam mattress, a hot-cure flexible PU foam mattress, a PU gel foam mattress, a latex mattress or a box spring mattress, each containing at least a portion made of a cold-cure flexible slabstock PU foam according to the invention. These types of mattress are known per se to those skilled in the art and are also marketed worldwide under these names. Mattresses made solely of cold-cure flexible slabstock PU foam are usually referred to on the market simply as cold foam mattresses. The term mattress as used for the purposes of the present invention also encompasses corresponding mattress coverings and underlays.

The production of corresponding cold-cure flexible slabstock PU foams in principle requires no further explanation, but some preferred details of the production of the PU foam used for the purposes of the invention are given below. The subject matter of the invention is described by way of example hereinbelow, without any intention that the invention be restricted to these illustrative embodiments. Where ranges, general formulae or compound classes are specified below, these are intended to include not only the corresponding ranges or groups of compounds which are explicitly mentioned but also all subranges and subgroups of compounds which can be obtained by removing individual values (ranges) or compounds. Where documents are cited in the context of the present description, the entire content thereof, particularly with regard to the subject matter that forms the context in which the document has been cited, is intended to form part of the disclosure content of the present invention. Unless otherwise stated, percentages are in percent by weight. Where average values are given hereinbelow, the values concerned are weight averages, unless otherwise stated. Where parameters which have been determined by measurement are reported below, the measurements have been carried out at a temperature of 23° C. and a pressure of 100 kPa, unless stated otherwise.

Polyurethanes are all reaction products derived from isocyanates, in particular polyisocyanates, and polyols. As is known to those skilled in the art the corresponding reaction of polyisocyanates and polyols may also have further reaction components added to it which results in further different reaction products. Thus, the reaction of added water leads to polyureas. Thus, among others, polyisocyanurates, polyureas, and allophanate-, biuret-, uretdione-, uretonimine- or carbodiimide-containing isocyanate or polyisocyanate reaction products are also typically obtained (for example by reaction of isocyanate groups with urethane or urea groups to form allophanate or biuret structures respectively) and the abovementioned polyisocyanates, polyureas etc. are therefore preferably also encompassed by the term polyurethane. It will be appreciated that a person skilled in the art seeking to produce the different flexible polyurethane foam types, for example cold-cure flexible slabstock PU foams, will appropriately select the substances necessary for each respective purpose, such as isocyanates, polyols, stabilizers, surfactants, etc., in order to obtain the polyurethane type, especially polyurethane foam type, desired in each case. Further details of the usable starting materials, catalysts and auxiliaries and additives can be found, for example, in Kunststoffhandbuch [Plastics Handbook], volume 7, Polyurethane [Polyurethanes], Carl-Hanser-Verlag Munich, 1st edition 1966, 2nd edition 1983 and 3rd edition 1993. The compounds, components and additives which follow are mentioned merely by way of example and can be replaced and/or supplemented by other substances known to those skilled in the art.

The isocyanate components used are preferably one or more organic polyisocyanates having two or more isocyanate functions. The polyol components used are preferably one or more polyols having two or more isocyanate-reactive groups.

Isocyanates suitable as isocyanate components for the purposes of this invention are all isocyanates containing at least two isocyanate groups. It is generally possible to use all aliphatic, cycloaliphatic, arylaliphatic and preferably aromatic polyfunctional isocyanates known per se. It is preferable to employ isocyanates in a range from 60 to 150 mol %, particularly preferably in a range from 80 to 130 mol %, relative to the sum of the isocyanate-consuming components.

Specific examples are alkylene diisocyanates having 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate or IPDI for short), hexahydrotolylene 2,4- and 2,6-diisocyanate and also the corresponding isomer mixtures, and preferably aromatic diisocyanates and polyisocyanates, for example tolylene 2,4- and 2,6-diisocyanate (TDI) and the corresponding isomer mixtures, mixtures of diphenylmethane 2,4'- and 2,2'-diisocyanates (MDI) and polyphenylpolymethylene polyisocyanates (crude MDI) and mixtures of crude MDI and tolylene diisocyanates (TDI). The organic diisocyanates and polyisocyanates may be used individually or in the form of mixtures thereof.

It is also possible to use isocyanates modified by the incorporation of urethane, uretdione, isocyanurate, allophanate and other groups, so-called modified isocyanates.

Particularly suitable organic polyisocyanates which are therefore particularly preferably employed are various isomers of tolylene diisocyanate (tolylene 2,4- and 2,6-diisocyanate (TDI), in pure form or as isomer mixtures of various composition), diphenylmethane 4,4'-diisocyanate (MDI), "crude MDI" or "polymeric MDI" (contains the 4,4' isomer and also the 2,4' and 2,2' isomers of MDI and products having more than two rings) and also the two-ring product which is referred to as "pure MDI" and is composed predominantly of 2,4' and 4,4' isomer mixtures, and prepolymers derived therefrom. Examples of particularly suitable isocyanates are detailed, for example, in EP 1712578, EP 1161474, WO 00/58383, US 2007/0072951, EP 1678232 and WO 2005/085310, which are hereby fully incorporated by reference.

Polyols suitable as the polyol component in a general sense include all organic substances having multiple isocyanate-reactive groups, preferably OH groups, and also preparations thereof. However, this normally refers to polymeric compounds having two or more OH groups. The molar mass of the polyol is greater than 500 g/mol. This delimits polyols from the low molecular weight crosslinkers employed as auxiliaries especially in cold-cure flexible slabstock foams.

Based on the total polyol component >50% by weight of cold-cure flexible foam ether polyols having molar masses of >1500 g/mol per OH group are employed. Corresponding cold-cure flexible foam ether polyols have an OH functionality of 3, i.e. they are normally obtained by alkoxylation from starters such as glycerol or trimethylolpropane. The overall molar mass is therefore >4500 g/mol. Furthermore, corresponding cold-cure foam ether polyols are characterized by predominantly primary OH groups. The proportion of primary OH groups based on the total OH groups is >60 mol %. This may be achieved by a late addition of ethylene oxide in the alkoxylation reaction. Cold-cure foam ether polymers are often marketed with solid polymeric fillers wherein these fillers are reactively bound to the surrounding cold-cure foam ether polyols. In the PU industry these are often also referred to as cold-cure foam polymer polyols notwithstanding that, strictly speaking, a normal cold-cure foam ether polyol without fillers is a polymeric polyol too. The cold-cure foam polymer polyols are thus a subset of the cold-cure foam ether polyols. Contemplated polymeric fillers for cold-cure foam ether polyols include for example copolymers of styrene-acrylonitrile (SAN) or PHD (polyurea dispersion) (by reaction of hydrazine with polyisocyanate) or PIPA (polyisocyanate polyaddition products) (by reaction of alkanolamine with polyisocyanate). It is important for polymer polyols for cold-cure flexible foam that the liquid phase is a cold-cure flexible foam ether polyol, i.e. has a molar mass >4500 g/mol and comprises predominantly (>60%) primary OH groups, Preferred polyols are all polyether polyols and/or hydroxyl group-containing aliphatic polycarbonates which are customarily used for producing polyurethane systems, in particular polyurethane foams, in particular polyether polycarbonate polyols and/or filled polyols (polymer polyols) such as SAN, PHD and PIPA polyols which contain solid organic fillers up to a solids content of 40% or more in dispersed form, and/or autocatalytic polyols which contain catalytically active functional groups, in particular amino groups, and/or polyols of natural origin, known as "natural oil-based polyols" (NOPs). The polyols for cold-cure flexible slabstock PU foam preferably have a functionality of 2.5 to 4 and number-average molecular weights in the range from 4500 to 8000 g/mol and consist largely of propylene oxide units. It is customary to employ polyols having OH values within a range from 20 to 45 mg KOH/g. The OH function is largely primary. This is achieved in the polyol production via ethylene oxide end blocks.

The number-average molecular weights are usually determined by gel permeation chromatography (GPC), especially using polypropylene glycol as reference substance and tetrahydrofuran (THF) as eluent. The OH values can, in particular, be determined in accordance with DIN standard DIN 53240-2:2007-11.

In a further preferred embodiment of the invention, it is additionally also possible to employ di- and/or trifunctional polyether alcohols comprising secondary hydroxyl groups in amounts of preferably below 50%, particularly preferably of 0% to 25%, such as are per se typical for hot-cure flexible slabstock PU foam.

In a further preferred embodiment, it is possible to use not only the polyether alcohols described here but also further polyether alcohols which bear primary hydroxyl groups and are altogether predominantly based on ethylene oxide, in particular having a proportion of ethylene oxide blocks of >70%, preferably >90% ("hypersoft polyol").

All polyether alcohols described in the context of this preferred embodiment preferably have a functionality of 2 to 8, more preferably 2 to 5, number-average molecular weights in the range from 500 to 8000 g/mol, preferably 500 to 7000 g/mol, and typically OH numbers in the range from 5 to 100 mg KOH/g, preferably 20 to 60 mg KOH/g. Polyols having primary OH functions may be used in the cold-cure flexible PU foams according to the invention not only alone but also in combination with polyols having secondary OH groups. Polyols having secondary OH functions are employed in this combination only to an extent of <50%.

In a further preferred embodiment of the invention, autocatalytic polyols may be used. These contain catalytically active units in the polyol structure and the use of separate catalysts for assisting the reaction of the isocyanate may therefore be eschewed or at least the usage amount reduced.

In a further preferred embodiment of the invention, recycled polyols may be used. A cold-cure flexible slabstock PU foam body obtained with co-use of recycled polyols accordingly corresponds to a preferred embodiment of the invention. Recycled polyols are polyols that are obtained from PU foam waste. This may be production waste from cold-cure flexible slabstock PU foam production itself or from cold-cure flexible slabstock PU foam waste after use by the consumer (for example old mattresses). In both cases, PU foam is liquefied by chemical processes. Various processes are useful here, for example, glycolysis, hydrolysis or acidolysis. The obtained liquid recycled polyol may then be reused for production of flexible PU foam. However, such cold-cure flexible slabstock PU foams often have distinctly disadvantageous mechanical properties. Further information concerning the use of recycled polyols in hot-cure flexible slabstock PU foams is obtainable inter alia from the following research report from BMBF having funding references 01RI05070 to 01RI05075: https://www.cleaner-production.de/fileadmin/assets/bilder/BMBF-Projekte/01RI05070-075_-Abschlussbericht.pdf.

The co-use of recycled polyols in the context of the invention corresponds to a preferred embodiment of the invention for each item of subject-matter claimed.

According to the invention by preference less than 2 parts and preferably no polyester ether having an OH number of 55 to 57 mg KOH/g per 100 parts of polyol are employed. Such polyester ethers are described in CN109970949A.

Such polyester ethers are obtainable by reaction of polyethers, which are in turn obtainable by reaction of glycerol and alkylene oxides (such as ethylene oxide and/or propylene oxide), with caprolactam and capping with further alkylene oxide (particularly propylene oxide).

A preferred ratio of isocyanate and polyol, expressed as the isocyanate index of the formulation, i.e. as the stoichiometric ratio of isocyanate groups to isocyanate-reactive groups (e.g. OH groups, NH groups) multiplied by 100, is in the range from >95 to ≤115. An index of 100 represents a molar ratio of reactive groups of 1:1.

The cold-cure flexible slabstock PU foams according to the invention can also be produced using catalysts. The expression "catalysts", for the purposes of the present invention, includes all compounds known from the prior art which are able to catalyse isocyanate reactions and/or are used as catalysts, cocatalysts or activators in the production of polyisocyanate reaction products, in particular polyurethane foams. According to the invention, a tin catalyst must be used. Tin catalysts which can be used accordingly, such as for example tin(II) ethylhexanoate, are known to the person skilled in the art.

Suitable catalysts are known; these are especially substances that catalyse the gel reaction (isocyanate-polyol), the blowing reaction (isocyanate-water) and/or the di- or trimerization of the isocyanate. Such catalysts are preferably nitrogen-containing compounds, especially tertiary amines and ammonium salts, and/or metal compounds.

Examples of suitable nitrogen-containing compounds as catalysts for the purposes of the present invention are the amines triethylamine, N,N-dimethylcyclohexylamine, N,N-dicyclohexylmethylamine, N,N-dimethylaminoethylamine, N,N,N',N'-tetramethylethane-1,2-diamine, N,N,N',N'-tetramethylpropane-1,3-diamine, N,N,N',N'-tetramethylbutane-1,4-diamine, N,N,N',N'-tetramethylhexane-1,6-diamine, N-[2-(dimethylamino)ethyl]-N,N',N'-trimethylethane-1,2-diamine, 2-[(2-(dimethylamino)ethyl)methylamino]ethanol, N',N'-dimethylpropane-1,3-diamine, N',N'-diethylpropane-1,3-diamine, 1-(2-aminoethyl)pyrrolidine, 1-(3-aminopropyl)pyrrolidine, 1-[3-(dimethylamino)propyl-(2-hydroxypropyl)amino]propan-2-ol, 2-[[3-(dimethylamino)propyl]methylamino]ethanol, 3-(2-dimethylamino)ethoxy)propylamine, N-[3-(dimethylamino)propyl]-N',N'-dimethylpropane-1,3-diamine, N'-[3-(dimethylamino)propyl]-N,N,N'-trimethylpropane-1,3-diamine, 1-[bis[3-(dimethylamino)propyl]amino]-2-propanol, N,N-bis[3-(dimethylamino)propyl]-N',N'-dimethylpropane-1,3-diamine, 1,4-diazabicyclo[2.2.2]octane (also known as TEDA), 1,4-diazabicyclo[2.2.2]octane-2-methanol, 1,2-dimethylimidazole, N-(2-hydroxypropyl)imidazole, 2-methyl-1-(2-methylpropyl)imidazole, N-(3-aminopropyl)imidazole, N-methylimidazole, 1-(3-aminopropyl)-2-methyl-1H-imidazole, N-ethylmorpholine, N-methylmorpholine, 2,2,4-trimethyl-2-silamorpholine, N-ethyl-2,2-dimethyl-2-silamorpholine, N-(2-aminoethyl)morpholine, N-(2-hydroxyethyl)morpholine, 2,2'-dimorpholinodiethyl ether, N,N'-dimethylpiperazine, N-(2-hydroxyethyl)piperazine, N-(2-aminoethyl)piperazine, N,N-dimethylbenzylamine, N,N-(dimethylamino)ethanol (also known as DMEA), N,N-(diethylamino)ethanol, 1-(2-hydroxyethyl)pyrrolidine, 3-dimethylamino-1-propanol, 1-(3-hydroxypropyl)pyrrolidine, 2-[2-(dimethylamino)ethoxy]ethanol, 2-[2-(diethylamino)ethoxy]ethanol, bis(2-dimethylaminoethyl) ether (also known as BDME), 2-[[2-(2-(dimethylamino)ethoxy)ethyl]methylamino]ethanol, N-[2-[2-(dimethylamino)ethoxy]ethyl]-N-methylpropane-1,3-diamine, 1,3,5-tris[3-(dimethylamino)propyl]hexahydro-1,3,5-triazine, 1,8-diazabicyclo[5.4.0]undec-7-ene, 1,5-diazabicyclo[4.3.0]non-5-ene, 1,5,7-triazabicyclo[4.4.0]dec-5-ene, N-methyl-1,5,7-triazabicyclo[4.4.0]dec-5-ene, 1,4,6-triazabicyclo[3.3.0]oct-4-ene, 1,1,3,3-tetramethylguanidine, 2-tert-butyl-1,1,3,3-tetramethylguanidine, guanidine, 1,1'-[(3-{bis[3-(dimethylamino)propyl]amino}propyl)imino]dipropan-2-ol, (3-aminopropyl)bis[3-(dimethylamino)propyl]amine, 3-(dimethylamino)propylurea, 1,3-bis[3-(dimethylamino)propyl]urea, 3-dimethylamino-N,N-dimethylpropanamide, 6-(dimethylamino)hexan-1-ol and 2,4,6-tris[(dimethylamino)methyl]phenol. Such catalysts and/or mixtures are commercially available for example under the names Jeffcat® ZF-10, Lupragen® DMEA, Lupragen® API, Toyocat® RX 20 and Toyocat® RX 21, DABCO® RP 202, DABCO® RP 204, DABCO® NE 300, DABCO® NE 310, DABCO® NE 400, DABCO® NE 500, DABCO® NE 600, DABCO® NE 650, DABCO® NE 660, DABCO® NE 740, DABCO® NE 750, DABCO® NE 1060, DABCO® NE 1080, DABCO® NE 1082 and DABCO® NE 2039, Niax® EF 860, Niax® EF 890, Niax® EF 700, Niax® EF 705, Niax® EF 708, Niax® EF 600, Niax® EF 602 and TEGOAMIN® ZE 1.

Suitable metal compounds as catalysts may be selected, for example, from the group consisting of metal-organic or organometallic compounds, metal-organic or organometallic salts, organic metal salts, inorganic metal salts and from the group consisting of charged or uncharged metal-containing coordination compounds, in particular metal chelate complexes. The expression "metal-organic or organometallic compounds" encompasses for the purposes of this invention in particular the use of metal compounds having a direct carbon-metal bond, here also referred to as metal organyls (e.g. tin organyls) or organometallic/organometal compounds (e.g. organotin compounds). The expression "organometallic or metal-organic salts" encompasses for the purposes of this invention in particular the use of metal-organic or organometallic compounds having salt character, i.e. ionic compounds in which either the anion or cation is metal-organic in nature (e.g. organotin oxides, organotin chlorides or organotin carboxylates). The expression "organic metal salts" encompasses for the purposes of this invention in particular the use of metal compounds that do not have any direct carbon-metal bond and are at the same time metal salts in which either the anion or the cation is an organic compound (e.g. tin(II) carboxylates). The expression "inorganic metal salts" encompasses for the purposes of this invention in particular the use of metal compounds or of metal salts in which neither the anion nor the cation is an organic compound, e.g. metal chlorides (e.g. tin(II) chloride), pure metal oxides (e.g. tin oxides) or mixed metal oxides, i.e. containing a plurality of metals, and/or metal silicates or aluminosilicates. The expression "coordination compound" encompasses for the purposes of this invention in particular the use of metal compounds formed from one or more central particles and one or more ligands, the central particles being charged or uncharged metals (e.g. metal- or tin-amine complexes). The expression "metal-chelate complexes" encompasses for the purposes of this invention in particular the use of metal coordination compounds that have ligands containing at least two sites of coordination or bonding to the metal centre (e.g. metal/tin polyamine complexes or metal/tin polyether complexes). Suitable metal compounds, especially as defined above, as catalysts in the sense of the present invention may be selected, for example, from all metal compounds comprising lithium, sodium, potassium, magnesium, calcium, scandium, yttrium, titanium, zirconium, vanadium, niobium, chromium, molybdenum, tungsten, manganese, cobalt, nickel, copper, zinc, mercury, aluminium, gallium, indium, germanium, tin, lead, and/or bismuth, especially sodium, potassium, magnesium, calcium, titanium, zirconium, molybdenum, tungsten, zinc, aluminium, tin and/or bismuth, more preferably tin, bismuth and/or zinc.

Suitable metal-containing coordination compounds include, for example, any metal acetylacetonates such as nickel(II) acetylacetonate, zinc(II) acetylacetonate, copper (II) acetylacetonate, molybdenum dioxoacetylacetonate, any iron acetylacetonates, any cobalt acetylacetonates, any zirconium acetylacetonates, any titanium acetylacetonates, any bismuth acetylacetonates and any tin acetylacetonates. Particularly suitable metal-organic salts and organic metal salts, particularly as defined above, as catalysts in the context of the present invention, are, for example, organotin, tin, zinc, bismuth and potassium salts, especially corresponding metal carboxylates, alkoxides, thiolates and mercaptoacetates, for example dibutyltin diacetate, dimethyltin dilaurate, dibutyltin dilaurate (DBTDL), dioctyltin dilaurate (DOTDL), dimethyltin dineodecanoate, dibutyltin dineodecanoate, dioctyltin dineodecanoate, dibutyltin dioleate, dibutyltin bis-n-laurylmercaptide, dimethyltin bis-n-laurylmercaptide, monomethyltin tris-2-ethylhexylmercaptoacetate, dimethyltin bis-2-ethylhexylmercaptoacetate, dibutyltin bis-2-ethylhexylmercaptoacetate, dioctyltin bisisooctylmercaptoacetate, tin(II) acetate, tin(II) 2-ethylhexanoate (tin(II) octoate), tin(II) isononanoate (tin(II) 3,5,5-trimethylhexanoate), tin(II) neodecanoate, tin(II) ricinoleate, zinc(II) acetate, zinc(II) 2-ethylhexanoate (zinc(II) octoate), zinc(II) isononanoate (zinc(II) 3,5,5-trimethylhexanoate), zinc(II) neodecanoate, zinc(II) ricinoleate, bismuth acetate, bismuth 2-ethylhexanoate, bismuth octoate, bismuth isononanoate, bismuth neodecanoate, potassium formate, potassium acetate, potassium 2-ethylhexanoate (potassium octoate), potassium isononanoate, potassium neodecanoate and/or potassium ricinoleate. Suitable metallic catalysts are generally selected with preference such that they do not have any inherent nuisance odor, are substantially unobjectionable toxicologically, and endow the resultant polyurethane systems, especially polyurethane foams, with as low a level of catalyst-induced emissions as possible. Commercial products are for example KOSMOS® T 9, KOSMOS® 54, KOSMOS® EF, KOSMOS® T 900.

Suitable catalysts are mentioned, for example, in DE 102007046860, EP 1985642, EP 1985644, EP 1977825, US 2008/0234402, EP 0656382 B1 and US 2007/0282026 A1, and the patent documents cited therein.

Suitable use amounts of catalysts are guided by the type of catalyst and are preferably in the range from 0.01 to 5.0 pphp, more preferably in the range from 0.02 to 3.00 pphp (=parts by weight based on 100 parts by weight of polyol). Catalysts may comprise isocyanate-reactive OH and NH groups but not more than 2 per molecule. This delimits them from crosslinkers. The OH numbers of the commercial products often result from the glycols and polyethers used for diluting the catalysts into ready-to-use preparations.

Employable optional additives include all substances which are known from the prior art and find use in the production of polyurethanes, especially of cold-cure flexible slabstock PU foams, for example blowing agents, preferably water for formation of $CO_2$, and, if necessary, further physical blowing agents, chain extenders (difunctional compounds such as glycols), stabilizers against oxidative degradation (called antioxidants), flame retardants, surfactants, biocides, cell-refining additives, cell openers, solid fillers, antistatic additives, nucleating agents, thickeners and viscosity regulators, dyes, pigments, color pastes, fragrances, emulsifiers, buffer substances and/or catalytically active substances, especially as defined above.

Water is generally used as the blowing agent in the production of cold-cure flexible slabstock PU foams. It is preferable to use an amount of water such that the water concentration is from 1.0 to 4.0 pphp (pphp=parts per hundred parts polyol=parts by weight based on 100 parts by weight of polyol).

It is also possible to use suitable physical blowing agents. These are, for example, liquefied $CO_2$ and volatile liquids, for example hydrocarbons having 3, 4 or 5 carbon atoms, preferably cyclopentane, isopentane and n-pentane, oxygen-containing compounds such as methyl formate, acetone and dimethoxymethane, or chlorinated hydrocarbons, preferably dichloromethane and 1,2-dichloroethane.

Apart from water and the physical blowing agents, it is also possible to use other chemical blowing agents which react with isocyanates to evolve a gas, for example formic acid.

Suitable optional stabilizers against oxidative degradation, called antioxidants, are preferably all standard free-radical scavengers, peroxide scavengers, UV absorbers, light stabilizers, complexing agents for metal ion contaminants (metal deactivators). Preference is given to using compounds of the following classes of substances, or classes of substances containing the following functional groups, substituents on the respective parent molecules preferably being especially substituents bearing groups that are reactive toward isocyanate: 2-(2'-hydroxyphenyl)benzotriazoles, 2-hydroxybenzophenones, benzoic acids and benzoates, phenols, in particular comprising tert-butyl and/or methyl substituents on the aromatic entity, benzofuranones, diarylamines, triazines, 2,2,6,6-tetramethylpiperidines, hydroxylamines, alkyl and aryl phosphites, sulfides, zinc carboxylates, diketones.

Suitable optional flame retardants in the context of this invention are all substances which are regarded as suitable for this purpose according to the prior art. Preferred flame retardants are, for example, liquid organophosphorus compounds such as halogen-free organophosphates, e.g. triethyl phosphate (TEP), halogenated phosphates, for example tris (1-chloro-2-propyl) phosphate (TCPP) and tris(2-chloroethyl) phosphate (TCEP), and organic phosphonates, for example dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids such as expandable graphite and melamine.

To stabilize the rising foam mixture and to influence the foam properties of polyurethane foams, organomodified and unmodified siloxanes may usually be used in the production of cold-cure flexible slabstock PU foams. These compounds may be produced as described in the prior art. Suitable examples are described for example in U.S. Pat. No. 7,838,566B2. Foam stabilizers for cold-cure flexible slabstock PU foams are characterized by relatively small modified or unmodified siloxane structures having fewer than 30 Si units and optionally pendant polyethers. Polyether-modified foam stabilizers are also referred to as polydialkylsiloxy-polyoxyalkylene copolymers. In addition, unmodified siloxanes are also used for cold-cure flexible slabstock foams. The foam stabilizer has the task of ensuring the stability of the foaming reaction mixture and influencing the cell structure of the resulting cold-cure flexible slabstock PU foam. Without foam stabilizer, a collapse is observed, and hence no homogeneous foam is obtained. By contrast, the use of long-chain and thus more potent siloxane stabilizers as are typical for hot-cure flexible PU foam results in overstabilization and thus shrinkage after foam production in cold-cure flexible slabstock PU foams.

Crosslinkers are described hereinabove. For the crosslinkers the calculation of the OH number is carried out according to the scientifically customary process from the molar mass and the number of OH groups. In the case of water-containing mixtures water is not taken into account in the PU industry and for the purposes of the present invention since it must be separately considered as a chemical blowing agent (reaction with the isocyanate). OH numbers (in mg KOH per g of sample) therefore do not take into account the water content which must be separately accounted for. The OH number may also be determined by analytical measurement (for example DIN 53240-2-2007-11) but in the case of water-containing samples this must be combined with water determination (Karl Fischer according to ISO 760:1978) to calculate the OH number without water. The expanded OH number is the sum of the conventional OH number without water and the amine number based on primary and secondary amines.

The low-nitrogen or nitrogen-free crosslinkers according to the invention for cold-cure slabstock foams may be employed for example with suitable solvents and diluents and/or further additives. Suitable optional solvents include all substances suitable according to the prior art. Particularly suitable are water, carboxylic esters (for example esters of fatty acids) and polyesters, alcohols, glycols and polyethers. The crosslinkers according to the invention in each case preferably represent more than 50% of the mixture. Particular preference is given to solvents which are readily employable in the cold-cure polyurethane slabstock foaming operation and do not adversely affect the properties of the foam. For example, isocyanate-reactive compounds are suitable, since they are incorporated into the polymer matrix by reaction and do not generate any emissions in the foam. The functionality of these chosen solvents is ≤2. Examples are OH-functional compounds such as water, (poly)alkylene glycols, preferably monoethylene glycol (MEG or EG), diethylene glycol (DEG), triethylene glycol (TEG), 1,2-propylene glycol (PG), dipropylene glycol (DPG), trimethylene glycol (propane-1,3-diol, PDO), tetramethylene glycol (butanediol, BDO), butyl diglycol (BDG), neopentyl glycol, 2-methylpropane-1,3-diol (ORTEGOL® CXT) and higher homologues thereof, for example polyethylene glycol (PEG) having average molecular masses between 200 g/mol and 3000 g/mol. Particularly preferred OH-functional compounds further include polyethers having average molecular masses of 200 g/mol to 4500 g/mol, in particular 400 g/mol to 2000 g/mol, in particular those based on propylene oxide (PO) and/or ethylene oxide (EO) blocks.

In preferred embodiments, the crosslinkers according to the invention or the crosslinker mixture according to the invention may be added to the cold-cure slabstock foam production in pure form or in admixture with solvents or any other component of the cold-cure slabstock foam formulation.

It may be particularly advantageous when the production of the cold-cure flexible slabstock PU foam produces and/or employs a composition which comprises at least the nitrogen-free or at most low-nitrogen crosslinkers according to the invention or a mixture of the crosslinkers according to the invention and at least one polyol component and optionally one or more blowing agents (including water).

It is preferable when the nitrogen-free or at most low-nitrogen crosslinkers according to the invention or a mixture of the crosslinkers according to the invention are each used in a total amount corresponding to a mass fraction of 0.1 to 5.0 parts (pphp), preferably 0.3 to 3.0 parts and particularly preferably 0.5 to 2.0 parts based on 100 parts (pphp) of polyol component.

The production of the cold-cure flexible slabstock PU foams according to the invention may be carried out by all processes with which a person skilled in the art is familiar, for example in manual mixing processes or preferably with the aid of foaming machines, in particular low-pressure or high-pressure foaming machines. The rising foam is not limited in its expansion on all sides by a mould. A free-rise foam or slabstock foam is thus concerned. The downwards (bottom) or sideways (side walls) limitations customary in slabstock foam machines are to be disregarded since the foam can expand upwards.

Any process for producing cold-cure flexible slabstock PU foams known to those skilled in the art may be used. For example, the foaming operation can be effected either in the horizontal or in the vertical direction, in batchwise plants or continuous plants. The compositions used in accordance with the invention may similarly be used for $CO_2$ technology. Use in low-pressure and high-pressure machines is possible, with the compositions to be processed being able to be metered directly into the mixing chamber or be admixed even before the mixing chamber with one of the components which then go into the mixing chamber. Admixture in the raw material tank is also possible.

Examples

The effect according to the invention was tested using cold-cure flexible slabstock foam experiments using the following basic formulation:

100.00 parts of VORALUX ® HN 360
2.49 parts of separate water (2.70 parts water including water in additives)
0.15 parts of DABCO ® 33 LV
0.05 parts of DABCO ® BL 11
0.15 parts of KOSMOS ® T 9
0.30 parts of TEGOSTAB ® B 8783 LF 2
1.40 parts of DABCO ® DEOA LF (85%) (15% water)
TDI 80, Index <105>

This formulation represents the typical prior art. It is based on established raw materials and employs a nitrogen-containing compound as the crosslinker (diethanolamine in the form of DABCO® DEOA LF). The formulation is not VOC optimized since especially the amine catalysts are volatile. The present formulation according to the prior art has aging and compression properties which are acceptable but still capable of improvement. This is apparent in the following experiments from poorer values in the dry compression test (dry compression set).

Improvement in the context of the present invention was achieved by employing various crosslinkers instead of diethanolamine. A further nitrogen-containing crosslinker (diisopropanolamine) was used here. A cold flow additive was also used for comparison. This cold flow additive likewise contains partially crosslinking components but has a lower expanded OH number. It is likewise nitrogen-containing. The cold flow additive is typically used in large industrial scale plants by reducing diethanolamine (typically 50%) and adding such a cold flow additive (ORTEGOL® 204). The purpose here is to achieve rapid crosslinking of the produced cold-cure flexible slabstock foam in reactive storage which requires dimensional stability of the foam blocks during curing and storage. This technology is likewise prior art. However, it does not allow the improvement in aging, compression and long-term usage properties sought according to the invention and the problem to be solved therefore remains.

According to the invention nitrogen-containing crosslinkers were then completely replaced by practically nitrogen-free crosslinkers (nitrogen content <0.5% by weight) having a functionality f>=3.

One example is the use of a specific low-nitrogen crosslinker mixture consisting of a sugar alcohol, one or more further low molecular weight crosslinkers and water as solvent. It was surprisingly found that positive effects in terms of aging, compression and long-term usage properties were obtained. The properties of the resulting cold-cure flexible slabstock foam in all other parameters were also satisfactory. This mixture was examined as "low-nitrogen crosslinker mixture".

Raw Materials Used:

VORALUX® HN 360: Polymer polyol from DOW comprising 16% polymer particles. The base polyol has a molar mass of 5000 g/mol. VORALUX® HN 360 has an OH number of 30 mg KOH/g. The expanded OH number is also 30 mg KOH/g.

D-sorbitol (also known as D-glucitol or sorbitol): Crosslinker having 6 OH groups and a molar mass of 182.2 g/mol. This gives an OH number of 1848 mg KOH/g. Crystalline D-sorbitol from Sigma Aldrich was employed. The expanded OH number is also 1848 mg KOH/g.

Maltitol: Crosslinker having 9 OH groups and a molar mass of 344.3 g/mol. This gives an OH number of 1467 mg KOH/g. Maltitol from Sigma-Aldrich was employed. The expanded OH number is also 1467 mg KOH/g.

Diglycerol (also known as bis(2,3-dihydroxypropyl) ether): Crosslinker having 4 OH groups and a molar mass of 166 g/mol. This gives an OH number of 1352 mg KOH/g. A technical grade product (>85%) from Sigma Aldrich was employed. The expanded OH number is also 1352 mg KOH/g.

Triglycerol: Crosslinker having 5 OH groups and a molar mass of 240.25 g/mol. This gives an OH number of 1168 mg KOH/g. Triglycerol from Sigma Aldrich was employed. The expanded OH number is also 1168 mg KOH/g.

DABCO® 33 LV: Amine catalyst for assisting the gel reaction from Evonik Operations GmbH consisting of 33% diazabicyclooctane (CAS 205-999-9) and 67% dipropylene glycol. OH number of product: 560 mg KOH/g. The expanded OH number is also 560 mg KOH/g since only tertiary amine groups are present. DABCO® 33 LV is an amine catalyst and does not have any crosslinking effect.

DABCO® BL 11: Amine catalyst for assisting the blowing reaction from Evonik Operations GmbH consisting of 70% bis(dimethylaminoethyl)ether (CAS 3033-62-3) and 30% dipropylene glycol. OH number of product: 251 mg KOH/g. The expanded OH number is also 251 mg KOH/g since only tertiary amine groups are present. DABCO® BL 11 is an amine catalyst and does not have any crosslinking effect.

KOSMOS® T 9: Tin catalyst for assisting the gel reaction consisting of tin(II) ethylhexanoate (CAS 301-10-0).

DABCO® DEOA LF: amine-containing crosslinker from Evonik Operations GmbH consisting of 85% diethanolamine (CAS 111-42-2) and 15% water. The OH number (without water!) for DABCO® DEOA LF is 908 mg KOH/g. Additionally, owing to the secondary amine function, the amine number for the 85% strength product is 454 mg KOH/g. The expanded OH number of the DABCO® DEOA LF is thus approximately 1362 mg KOH/g.

TEGOSTAB® B 8783 LF 2: Silicone-based foam stabilizer from Evonik Operations GmbH. OH number: 133 mg KOH/g.

Inventive crosslinker additive (=low-nitrogen mixture) consisting of:
a) sorbitol and/or maltitol (40-60% by weight of the mixture)
b) diglycerol and/or triglycerol (15-30% by weight of the mixture)
c) water (15-35% by weight of the mixture),
wherein the expanded OH number of the crosslinker mixture is 1200-1300 mg KOH/g (without taking into account the water which must be separately accounted for as a chemical blowing agent in PU foam production).

ORTEGOL® 204: Mixture of linear polyethers, crosslinkers, urea and water for improving the block stability of cold-cure flexible foam blocks during curing (cold flow additive). The product is obtainable from Evonik Operations GmbH. ORTEGOL® 204 contains 25% water and has an expanded OH number of 860 mg KOH/g.

Diisopropanolamine: Technical grade diisopropanolamine. Obtainable from Sigma Aldrich. The OH number is 842.5 mg KOH/g. An amine number from the secondary amine function of 421 mg KOH/g additionally results. The expanded OH number of the diisopropanolamine is thus 1263 mg KOH/g. Diisopropanolamine is an amine-based crosslinker.

DABCO® NE 1082: Low-emission amine catalyst for assisting the gel reaction from Evonik Operations GmbH based on 1,3-bis[3-dimethylamino)propyl]urea (CAS 52338-87-1). The expanded OH number is 15 mg KOH/g. This is the result of amine-containing byproducts in the technical product. DABCO® NE 1082 is an amine catalyst and does not have any crosslinking effect.

DABCO® NE 300: Low-emission amine catalyst for assisting the blowing reaction from Evonik Operations GmbH based on N-[2-[2-(dimethylamino)ethoxy]ethyl]-N-methyl-1,3-propanediamine (CAS 189253-72-3). The expanded OH number is 276 mg KOH/g. This comes from the primary amine group of the product. DABCO® NE 300 is an amine catalyst and does not have any crosslinking effect.

KOSMOS® EF: Low-emission tin catalyst for assisting the gel reaction from Evonik Operations GmbH.

TDI 80: Technical grade tolylene diisocyanate from Covestro, Leverkusen, trade name Desmodur® T80, NCO content: 48%.

Foam behavior: General observation: Conspicuities in the expansion of the cold-cure flexible slabstock foam such as collapse of the foam being formed or shrinkage of the cured foam.

Rise time: The rise time is to be understood as meaning the time between termination of the mixing of the raw materials and achievement of the maximum foam height. It is a measure of the reactivity of the formulation and an important parameter in industrial slabstock foam production.

Degree of settling: The degree of settling is determined from the difference between the maximum foam height during rising of the foam and the foam height 5 min later. The reason for the settling is the cell-opening of the foam

|  | Foam 1 not according to the invention [Parts] | Foam 2 not according to the invention [Parts] | Foam 3 not according to the invention [Parts] | Foam 4 not according to the invention [Parts] | Foam 5 not according to the invention [Parts] | Foam 6 not according to the invention [Parts] | Foam 7 according to the invention [Parts] | Foam 8 according to the invention [Parts] |
|---|---|---|---|---|---|---|---|---|
| VORALUX® HN 360 | 100 | 100 | 100 | 100 | 100 | 100 | 100 | 100 |
| Water separate | 2.49 | 2.35 | 2.70 | 2.27 | 2.37 | 2.30 | 2.7 | 2.37 |
| DABCO® 33 LV | 0.15 | 0.15 | 0.15 | 0.15 | 0.15 | 0.15 | 0.15 | 0.15 |
| DABCO® BL 11 | 0.05 | 0.05 | 0.05 | 0.05 | 0.05 | 0.05 | 0.05 | 0.05 |
| KOSMOS® T 9 | 0.15 | 0.15 | 0.15 | 0.15 | 0.15 | 0.15 | 0.15 | 0.15 |
| TEGOSTAB® B 8783 LF2 | 0.30 | 0.30 | 0.30 | 0.30 | 0.30 | 0.30 | 0.30 | 0.30 |
| DABCO® DEOA LF (85%)(15% Water) | 1.40 | — | — | 0.70 | — | — | — | — |
| Diisopropanolamine (80% in Water) | — | 1.75 | — | — | — | — | — | — |
| Cold flow additive ORTEGOL® 204 (25% Water) | — | — | — | 1.30 | 1.30 | 1.60 | — | — |
| Diglycerol | — | — | — | — | — | — | 1.40 | — |
| Low-nitrogen crosslinker mixture (25% Water) | — | — | — | — | — | — | — | 1.30 |
| TDI 80, Index <105> | 35.63 | 36.13 | 32.52 | 35.89 | 34.29 | 34.76 | 35.60 | 35.17 |

Emission-Optimized Formulation.

In the emission-optimized formulation the non-VOC optimized catalysts were replaced with emission-optimized variants. As a result the cold-cure flexible slabstock foam is a low-emission foam.

|  | Foam 9 not according to the invention [Parts] | Foam 10 according to the invention [Parts] |
|---|---|---|
| VORALUX® HN 360 | 100 | 100 |
| Water separate | 2.49 | 2.70 |
| DABCO® NE 1082 | 0.2 | 0.2 |
| DABCO® NE 300 | 0.05 | 0.05 |
| KOSMOS® EF | 0.38 | 0.38 |
| TEGOSTAB® B 8783 LF 2 | 0.30 | 0.3 |
| DABCO® DEOA LF (85%)(15% Water) | 1.40 | — |
| Low-nitrogen crosslinker mixture (25% Water) | — | 1.3 |
| TDI 80, Index <105> | 35.65 | 35.25 |

Methods:

Analysis of the Raw Materials:

Analysis of the nitrogen content: The analysis of the nitrogen content of the employed crosslinkers is carried out by means of the well known Kjeldahl method as is described for other substrates inter alia in DIN EN 13342:2001-01 or DIN EN 13654-1:2002-01.

which allows the gas to escape until solidification of the polyurethane material as a result of the progressing reaction. The degree of settling is an indicator of the stability of the formulation.

Characterization of the Cold-Cure Flexible Slabstock Foam Properties:

Number of cells per cm (cell count): This is determined visually on a cut surface (measured in accordance with DIN EN 15702:2009-04). The number of cells is counted along a line.

Density: Determined as described in ASTM D 3574-11 under Test A by measuring the core density. Foam density is reported in $kg/m^3$.

Porosity according to FTC (force to crush) method:

Cold-cure foams always have a high proportion of closed cells. This can have the result that the foam body does not retain dimensional stability after cutting. The foam moreover has a propensity for shrinkage which can render it unusable. It is also known that the cold-cure slabstock PU foam exhibits its high flexibility only when the cell structure is fully opened. In practice, cold-cure slabstock PU foams are therefore generally crushed using suitable technologies, for example the vacuum method or by means of a roller apparatus. This operation is to be carried out in a gentle manner, i.e. without applying a great deal of force. The cell structure is also to be crushed as completely as possible. Both conditions, i.e. the ease and completeness of crushing, may be tested using a simple process.

Procedure:

To this end the foam piece to be tested is placed under the crushing machine (ideally without compressing it). The indentation resistance (ILD) is determined at 50% compression on the compression testing machine. This operation is performed 10× on fresh foam. After complete mechanical opening the operation is repeated for an 11th time. The difference between the first and the last value here indicates the total closed-cell content of the foam. The 11th value is a measure of the hardness of the foam.

Rebound elasticity: The rebound elasticity is determined by a falling ball experiment. This is defined in DIN EN ISO 8307:2008-03. A completely crushed foam is examined.

Hardness: The hardness or compressive strength of the resulting cold-cure PU foams is measured according to DIN EN ISO 3386-1:2015-10 by compression by 40% and measurement of the resulting force (CLD 40).

Comfort factor: The sag or comfort factor is a mechanical criterion. Here, a foam specimen is compressed according to DIN EN ISO 2439:2009-05 and the ratio of compressive stress at 65% and 25% compression is measured. Cold-cure flexible PU foams have a sag or comfort factor of preferably >2.5.

Compression set (90° C., 70%) [%]: Compression set is measured according to DIN EN ISO 1856:2008-01. Test specimens are compressed and in the compressed state stored under defined conditions. In the test performed here the foam test specimens were compressed by 70% and then stored in an oven at 90° C. for 22 h. In each case 6 test specimens were examined and the result subsequently averaged.

Wet compression set (75° C. and 80° C., 70%) [%]: Wet compression set or hot moist aging is measured according to DIN EN ISO 1856:2008-01. Test specimens are compressed and in the compressed state under defined conditions stored in an atmosphere with 100% atmospheric humidity. In the test performed here the foam test specimens were compressed by 70% and then stored in an oven at 80° C. or at 75° C. for 22 h. In each case 6 test specimens were examined and the result subsequently averaged.

VOC test: The reaction mixture is introduced into a PE plastic bag which is open at the top. After the foam has risen and blown off, the PE bag is closed 3 min after the blow-off. The foam is stored in this way at room temperature for 12 hours in order to enable complete reaction, but simultaneously in order to prevent premature escape of VOCs. Subsequently, the PE bag is opened and a 7 cm×7 cm×7 cm cube is taken from the centre of the foam block and immediately wrapped in aluminium foil and sealed airtight in a PE bag. It is then transported to the analytical laboratory, and the foam cube introduced into a cleaned 30 l glass test chamber. The conditions in the test chamber are controlled climatic conditions (temperature 21° C., atmospheric humidity 50%). Half the volume of the test chamber is exchanged per hour. After 24 hours, samples are taken from the test chamber air. Tenax adsorption tubes serve to absorb the VOCs. The Tenax tube is then heated, and the volatile substances released are cryofocused in a cold trap of a temperature-programmable evaporator with the aid of an inert gas stream. After the heating phase has ended, the cold trap is rapidly heated to 280° C. The focused substances vaporize in the process. They are subsequently separated in the gas chromatography separation column and detected by mass spectrometry. Calibration with reference substances permits a semi-quantitative estimate of the emission, expressed in "$\mu g/m^3$". The quantitative reference substance used for the VOC analysis (VOC value) is toluene. Signal peaks can be assigned to substances using their mass spectra and retention indices. The following equipment is used for the analysis: Gerstel, D-45473 Mühlheim an der Ruhr, Eberhard-Gerstel-Platz 1, TDS-3/KAS-4, Tenax® desorption tubes, Agilent Technologies 7890A (GC)/5975C (MS), column: HP Ultra2 (50 m, 0.32 mm, 0.52 µm), carrier gas: helium. More specific procedural instructions can be taken from DIN EN ISO 16000-9:2008-04.

Results:

Nitrogen Content of the Employed Crosslinkers/Crosslinking Additives:

DABCO® DEOA LF: 11.3%
Diisopropanolamine: 10.5%
ORTEGOL® 204: 6.1%
Diglycerol: 0%
Low-nitrogen crosslinker mixture 0%
Foam Results: See Following Tables:

| | Foam 1 | Foam 2 | Foam 3 | Foam 4 | Foam 5 | Foam 6 | Foam 7 | Foam 8 |
|---|---|---|---|---|---|---|---|---|
| Foam behaviour | OK | OK | Collapse | OK | Very strong settling | Strong settling | OK | OK |
| Rise time [s] | 117 | 101 | — | 105 | 96 | 90 | 131 | 109 |
| Settling [cm] | −0.5 | −0.8 | Collapse | −0.4 | −2.3 | −1.0 | −0.4 | −0.6 |
| Density [kg/m³] | 32.0 | 32.6 | — | 32.5 | 37.4 | 35.6 | 34.2 | 34.0 |
| Cell count [1/cm] | 11 | 11 | — | 11 | 11.5 | 11.5 | 11 | 11 |
| Hardness CLD 40% [kPa] | 3.2 | 4.0 | — | 3.6 | 4.8 | 4.6 | 3.9 | 4.1 |
| Comfort factor [ ] | 2.8 | 2.7 | — | 2.7 | 2.7 | 2.7 | 2.7 | 2.7 |
| Rebound elasticity [%] | 56 | 53 | — | 54 | 49 | 54 | 56 | 50 |
| FTC 1 [N] | 200 | 221 | — | 200 | 243 | 233 | 212 | 212 |
| FTC 11 [N] | 135 | 157 | — | 137 | 186 | 178 | 149 | 159 |
| Δ FTC 1 to FTC 11 [N] | 65 | 64 | — | 63 | 57 | 55 | 63 | 53 |
| Compression Set (90° C. 70%) [%] | 52 | 52 | — | 52 | 52 | 52 | 23 | 21 |
| Wet Compression Set (80° C. 70%) [%] | 60 | 56 | — | 60 | 50 | 52 | 45 | 39 |
| Wet Compression Set (75° C., 70%) [%] | 32 | 19 | — | 24 | 17 | 17 | 19 | 15 |

| | Foam 9 | Foam 10 |
|---|---|---|
| Foam behaviour | | |
| Rise time [s] | 129 | 131 |
| Settling [cm] | −0.6 | −0.6 |
| Density [kg/m³] | 32.5 | 32.6 |
| Cell count [1/cm] | 11 | 10 |

VOC Results for Emissions-Optimized Cold-Cure Foam Formulation:

Foam with DEOA (Foam 9):

| Retention time: [min] | Area | Concentration as toluene equivalent | |
|---|---|---|---|
| 5.8 | 880941 | 2 μg/m³ | benzene |
| 6.3 | 365985 | <1 μg/m³ | |
| 9.6 | 418430 | <1 μg/m³ | |
| 12.4 | 54422418 | 113 μg/m³ | styrene |
| 18.9 | 66193025 | 137 μg/m³ | 3-(diethylamino)pro-panenitrile |
| 22.6 | 5887884 | 12 μg/m³ | |
| 24.3 | 521489 | 1 μg/m³ | |
| 25.5 | 778835 | 2 μg/m³ | |
| 28.6 | 5765765 | 12 μg/m³ | |
| 29.0 | 2519745 | 5 μg/m³ | |
| 29.2 | 3256023 | 7 μg/m³ | |
| 29.3 | 1799679 | 4 μg/m³ | |
| 29.9 | 695525 | 1 μg/m³ | |
| 30.1 | 399065 | <1 μg/m³ | |
| 34.0 | 351318 | <1 μg/m³ | |
| | Total | 300 μg/m³ | |

Foam with the Low-Nitrogen Crosslinker Mixture (Foam 10):

| Retention time: [min] | Area | Concentration as toluene equivalent | |
|---|---|---|---|
| 5.8 | 432470 | <1 μg/m³ | |
| 6.3 | 514380 | 1 μg/m³ | |
| 9.6 | 523362 | 1 μg/m³ | |
| 12.4 | 56565489 | 117 μg/m³ | styrene |
| 18.9 | 71284866 | 148 μg/m³ | 3-(diethylamino)pro-panenitrile |
| 21.4 | 644699 | 1 μg/m³ | |
| 22.6 | 6030888 | 12 μg/m³ | |
| 24.3 | 567404 | 1 μg/m³ | |
| 25.5 | 835242 | 2 μg/m³ | |
| 28.6 | 6176953 | 13 μg/m³ | |
| 29.0 | 2519258 | 5 μg/m³ | |
| 29.2 | 3161609 | 7 μg/m³ | |
| 29.3 | 1583225 | 3 μg/m³ | |
| 29.9 | 651729 | 1 μg/m³ | |
| 30.1 | 430349 | <1 μg/m³ | |
| 34.0 | 349661 | <1 μg/m³ | |
| | Total | 320 μg/m³ | |

Description of Results:

The analysis of the nitrogen content of the employed crosslinking additive shows that DEOA, diisopropanolamine and ORTEGOL 204 are nitrogen-containing (≥0.500 by weight N). The low-nitrogen crosslinker mixture according to the invention is not nitrogen-containing (≤0.5% by weight N).

In the foaming of formulations containing the different additives a foam formulation with DEOA (foam 1) was produced as a reference according to the prior art. The resulting foam is stable and shows only slight settling. The density and also the cell count of the cold-cure foam formed are in the expected range. The comfort factor and rebound elasticity identify the foam formed as a cold-cure foam. The aging properties in the dry state (compression set) and in the moist state (wet compression set) exhibit the typical values regarded as problematic. Thus a compression set (90° C., 70%) of 52% shows that on average the sample recovers not even half of its original height after compression. As a further comparison a foam was produced without additional crosslinker (foam 3). This foam collapses and is thus not stable. The presence of a crosslinking additive is thus indispensable for the stability of the formulation. Cold-cure foams may also be successfully produced with other nitrogen-containing crosslinkers instead of diethanolamine. Thus in foam 2 diisopropanolamine was used instead of DEOA. The resulting foam exhibits very similar properties compared to foam 1 comprising DEOA. Settling, density and also cell count are in the normal range. However, the aging properties also exhibit similarly poor values as for DEOA. An improvement in aging behavior is thus not observed. However, sole usage of a likewise crosslinking additive for controlling cold flow—ORTEGOL 204—results in an unusually high degree of settling (−2.3 cm) (foam 5). This is a clear indication that the product is only of limited suitability as a crosslinker for achieving a sufficient stability of the rising cold-cure foam. This is also apparent when the usage amount of ORTEGOL 204 is increased from 1.3 parts to 1.6 parts (foam 6). However, this then causes the degree of settling to approach normal values at −1.0 cm. The lower stability of the formulation comprising only ORTEGOL 204 is also apparent from the unusually high density of the foam. This is why in industrial practice ORTEGOL 204 is used not as a sole crosslinker but rather together with crosslinkers such as for example DEOA. Foam 4 demonstrates this approach. ORTEGOL 204 contains 6.1% nitrogen. The resulting aging properties are comparable with those for DEOA in terms of compression set. By contrast, a slight improvement is registered for hot moist aging (wet compression set). Finally, the inventive nitrogen-free crosslinkers (≤0.5% by weight N) were tested. Diglycerol (foam 7) and a low-nitrogen crosslinker mixture were used here (foam 8). Degrees of settling, densities and cell counts are in an acceptable range despite a slight deterioration compared to pure DEOA being detectable in this formulation. A significant improvement in hot dry aging (compression set) at 90° C., 70% compression was detected. In hot moist aging too (wet compression set) a very considerable improvement was observed at both temperatures. The low-nitrogen crosslinker mixture is superior to pure diglycerol. The differences in aging properties cannot be explained by different porosities or cell counts of the foam specimens formed since the ΔFTC values are rather comparable. Overall, the use of the low-nitrogen crosslinkers results in an improvement in compression set in both the dry and the wet state and thus demonstrates significantly improved aging properties.

Formulations of the type foam 1 to foam 8 may also be produced in a low-emission manner by replacement of the employed catalysts, as apparent from the measured VOC test chamber results. Both test chamber results are below the critical value for total volatile organic substances of 500 μg/m³ and are therefore low-emission results.

The invention claimed is:

1. A process for producing cold-cure flexible slabstock PU foams, comprising: reacting at least one polyol component and at least one isocyanate component in the presence of water and at least one tin catalyst,
   wherein nitrogen-containing crosslinkers having an expanded OH number above 1000 mg KOH/g are employed in a total amount of less than or equal to 0.5 parts by weight, based on 100 parts by weight of the at least one polyol component, wherein nitrogen-containing crosslinkers in the context of the present invention have a nitrogen content of >0.5% by weight, measured by Kjeldahl analysis, and
   wherein at least two nitrogen-free or low-nitrogen crosslinkers having a nitrogen content of ≤0.5% by weight, measured by Kjeldahl analysis, are employed in a total amount ≥0.1 parts by weight, based on 100 parts by weight of the at least one polyol component, wherein not more than 4 parts by weight of water per 100 parts by weight of the at least one polyol component are employed and wherein, based on the total weight of the at least one polyol component, >50% by weight of cold-cure flexible foam ether polyols having molar masses of >1500 g/mol per OH group are employed and wherein all the crosslinkers employed have a functionality of isocyanate-reactive groups of ≥3, wherein isocyanates suitable as the least one isocyanate component include all isocyanates containing at least two isocyanate groups, wherein the isocyanate index is >95 and ≤115, wherein less than 2 parts by weight polyester ether having an OH number of 55 to 57 mg KOH/g per 100 parts by weight of the at least one polyol component is employed, and wherein the at least two nitrogen-free or low-nitrogen containing crosslinkers having a nitrogen content of ≤0.5% by weight are provided as a mixture comprising a combination of (i) maltitol and (ii) at least one of diglycerol and triglycerol, or a combination of 40 to 60% by weight of sorbitol and/or maltitol and 15 to 30% by weight of diglycerol and/or triglycerol and 15 to 35% by weight water.

2. The process according to claim 1, wherein the at least two nitrogen-free or low-nitrogen crosslinkers having a nitrogen content of ≤0.5% by weight is provided as a mixture comprising 40 to 60% by weight sorbitol, 15 to 30% by weight diglycerol or triglycerol, and 15 to 35% by weight water.

3. The process according to claim 1, wherein at least 50% by weight of the at least one polyol component has a functionality of 2.5 to 4, number-average molecular weights determined by gel permeation chromatography in the range from 4500 to 8000 g/mol and comprise >50%, of primary hydroxyl groups.

4. The process according to claim 1, wherein cold-cure foam polymer polyols are employed.

5. A cold-cure flexible slabstock PU foam, obtained by a process according to claim 1.

6. A cold-cure flexible slabstock PU foam according to claim 5, wherein based on its starting volume the PU foam body has been compressed by at least 20%, and is kept in compressed form by an auxiliary means for at least 20 hours.

7. A mattress or cushion comprising the cold-cure flexible slabstock PU foam according to claim 5.

8. The process according to claim 1, wherein the at least two nitrogen-free or low-nitrogen crosslinkers having a nitrogen content of ≤0.5% by weight comprise (i) maltitol and (ii) diglycerol or triglycerol.

9. The process according to claim 1, wherein nitrogen-containing crosslinkers having an expanded OH number above 1000 mg KOH/g are employed in a total amount of less than or equal to 0.1 parts by weight based on 100 parts by weight of the at least one polyol component.

10. The process according to claim 1, wherein at least two nitrogen-free or low-nitrogen crosslinkers having a nitrogen content of ≤0.5% by weight, measured by Kjeldahl analysis, are employed in a total amount ≥0.2 to 3 parts by weight relative to 100 parts by weight of the at least one polyol component.

11. The process according to claim 1, wherein the at least two nitrogen-free or low-nitrogen crosslinkers having a nitrogen content of ≤0.5% by weight, measured by Kjeldahl analysis, are employed in a total amount ≥0.5 to 2 parts by weight relative to 100 parts by weight of the at least one polyol component.

12. The process according to claim 1, wherein at least 50% by weight of the at least one polyol component has a functionality of 2.5 to 4, number-average molecular weight determined by gel permeation chromatography in the range from 4500 to 8000 g/mol and comprises from 70 to 95% of primary hydroxyl groups.

13. The cold-cure flexible slabstock PU foam according to claim 5, wherein based on its starting volume the PU foam body has been compressed by at least 30%, and is kept in compressed form by an auxiliary means for at least 20 hours.

14. The cold-cure flexible slabstock PU foam according to claim 5, wherein based on its starting volume the PU foam body has been compressed by at least 40%, and is kept in compressed form by an auxiliary means for at least 20 hours.

15. The process according to claim 1, wherein prior to reacting the at least two nitrogen-free or low-nitrogen containing crosslinkers having a nitrogen content of ≤0.5% by weight are provided as a mixture comprising 40 to 60% by weight of sorbitol and/or maltitol and 15-30% by weight of diglycerol and/or triglycerol and 15-35% by weight water.

16. The process according to claim 1, wherein the at least two nitrogen-free or low-nitrogen containing crosslinkers comprise triglycerol.

17. The process according to claim 1, wherein the at least two nitrogen-free or low-nitrogen containing crosslinkers comprise diglycerol.

* * * * *

UNITED STATES PATENT AND TRADEMARK OFFICE
CERTIFICATE OF CORRECTION

PATENT NO. : 12,060,451 B2
APPLICATION NO. : 17/367456
DATED : August 13, 2024
INVENTOR(S) : Modro et al.

It is certified that error appears in the above-identified patent and that said Letters Patent is hereby corrected as shown below:

On the Title Page

Item (56) under U.S. PATENT DOCUMENTS, currently omits, but should further list, the following references:
--7,615,580 B2   11/2009   Burdeniuc et al.
7,666,919 B2     02/2010   Burdeniuc et al.
8,034,848 B2     10/2011   Landers et al.
8,303,843 B2     11/2012   Glos et al.
8,552,078 B2     10/2013   Vedage et al.
8,735,458 B2     05/2014   Glos et al.
8,946,311 B2     02/2015   Schiller et al.
9,688,830 B2     6/2017    Emmrich-Smolczyk et al.--;

Column 2, Line 23, U.S. 2015/0031781 in Item (56) U.S. PATENT DOCUMENTS currently reads: "Anders et al."
And should read:
--Landers et al.--.

Signed and Sealed this
Seventeenth Day of December, 2024

Derrick Brent
*Acting Director of the United States Patent and Trademark Office*